United States Patent [19]
Vischer, Jr., deceased

[11] 4,084,889
[45] Apr. 18, 1978

[54] EYEGLASS FRAME

[75] Inventor: Alfred Vischer, Jr., deceased, late of Golden, Colo., by Peter Vischer, executor

[73] Assignee: Vischer Optics, Inc., Golden, Colo.

[21] Appl. No.: 709,497

[22] Filed: Jul. 28, 1976

[51] Int. Cl.² .................. G02C 5/14; G02C 5/22; G02C 5/16; E05D 9/00
[52] U.S. Cl. .................. 351/121; 351/153; 351/120; 351/113; 16/128 A
[58] Field of Search ........... 351/121, 120, 113, 153, 351/111, 41; 16/128 A, 169, 145, 140

[56] References Cited
U.S. PATENT DOCUMENTS

| 3,947,100 | 3/1976 | Vischer | 351/120 |
| 3,977,044 | 8/1976 | Mort | 16/169 |

*Primary Examiner*—Paul A. Sacher
*Assistant Examiner*—Rodney Bovernick
*Attorney, Agent, or Firm*—Edmond T. Patnaude

[57] ABSTRACT

There is described an eyeglass frame including a molded plastic lens having an integral hinge socket removably receiving a forwardly extending hinge portion of a unitary molded plastic temple member.

8 Claims, 9 Drawing Figures

EYEGLASS FRAME

The present invention relates in general to opthalmic mountings such as eyeglass frames, and it relates more particularly to improvements in the eyeglass frame described in U.S. Pat. No. 3,947,100.

BACKGROUND OF THE INVENTION

In the said patent there is described an eyeglass frame assembly including a novel detent construction for holding the temple pieces in the fully open position. In that frame assembly a separate, four-part hinge is attached to each temple piece and to the lens frame. The present invention incorporates the said novel detent in a more durable and stronger frame which is less costly to manufacture, easier for the doctor to fit to the patient, and more attractive in appearance than is the previous design.

SUMMARY OF THE INVENTION

Briefly, in accordance with the teachings of the present invention there is provided an eyeglass frame assembly in which hinge sockets and detent recesses are molded in the end portions of the lens frame, and the temple members have bifurcated forward end portions respectively cooperating with the hinge sockets and the detent recesses in the lens frame. Spring means are provided to removably secure the temple pieces to the lens frame and to assure a precision fit between the lens frame and the temple pieces irrespective of dimensional variations in the molded plastic parts. The eyeglass frames of this invention are utilized as part of a system in which a plurality of temple pieces having respectively different camber angles are provided. The person fitting the frames thus selects two temple pieces having the required camber angles and assembles them to the correct lens frame. No further adjustment of the frame is necessary or possible, whereby a proper fit is maintained throughout the life of the eyeglasses.

BRIEF DESCRIPTION OF THE DRAWINGS

Further objects and advantages and a better understanding of the present invention can be had by reference to the following detailed description, wherein.

DETAILED DESCRIPTION OF THE INVENTION

Figure 1:
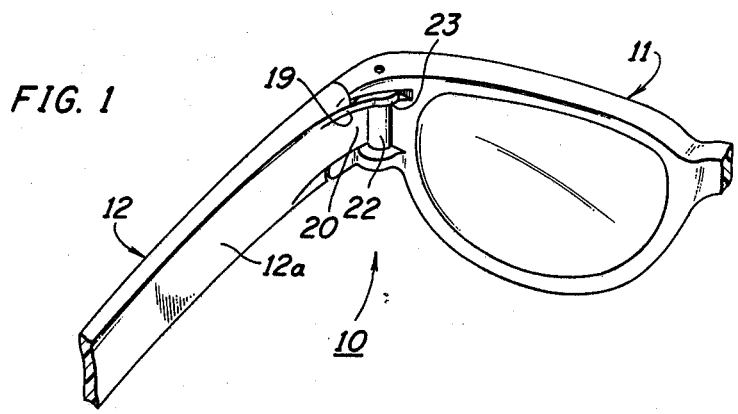
FIG. 1 is a rear view of the left hand portion of an eyeglass frame assembly embodying the present invention, the frame being shown in the fully open position.
Figure 2:
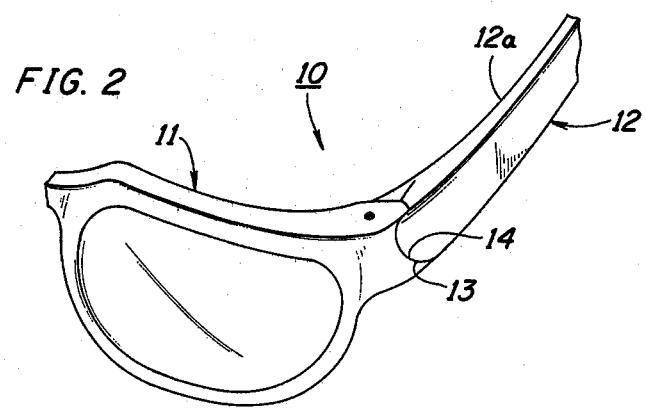
FIG. 2 is a front view of the left hand portion of the eyeglass frame assembly of FIG. 1.
Figure 3:
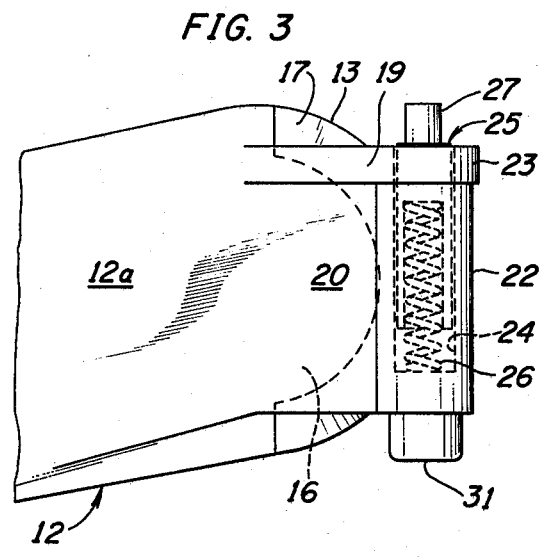
FIG. 3 is an elevational view (greatly enlarged) of the forward portion of the left hand temple piece in the assembly of FIG. 1, which view is taken from the inside of the temple piece.
Figure 4:
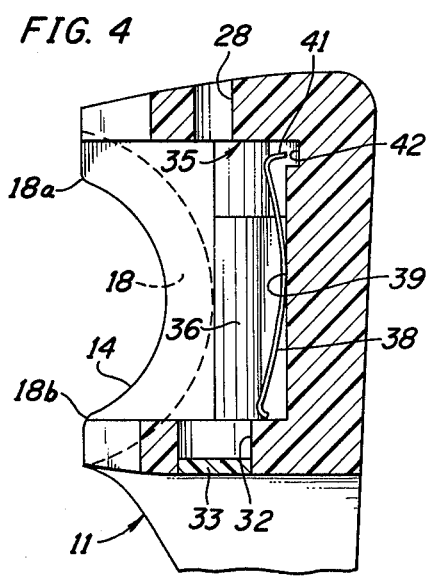
FIG. 4 is a vertical cross-sectional view taken through the vertical center line of the hinge socket portion of the lens frame in the assembly of FIG. 1.
Figure 5:
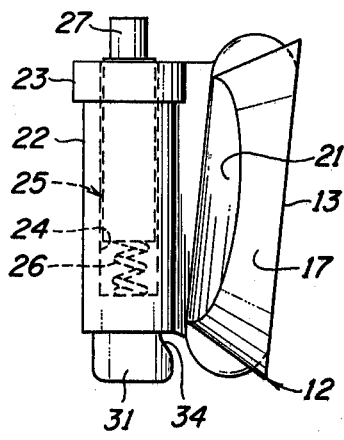
FIG. 5 is a forward end view of the temple piece shown in FIG. 3.

An eyeglass frame assembly embodying the present invention is partially illustrated in the fully open position in FIGS. 1 and 2 and is generally indicated by the number 10. Only the left-hand side of the lens frame and the forward portion of the left-hand temple are shown, but it will be understood by those skilled in the art that the overall frame assembly is substantially symmetrical although the camber angles for the two temple pieces may differ in order for the frame assembly to properly fit the face and head of the wearer.

The lens frame is generally identified by the number 11 and the left-hand temple piece is generally identified by the number 12. The forward outer edge 13 of the temple piece is arcuate and fits snugly against a complimentary arcuate edge 14 at the side of the lens frame. In the frame assembly 10 the temple piece 12 has zero camber and thus extends in a generally horizontal direction when the lens frame is vertical. Other temple pieces having positive or negative camber may, however, be used with the lens frame 11 and a line contact between the frame edge 14 and the forward edge 13 of the temple pieces will nevertheless be provided.

Referring to FIGS. 3, 5, 6 and 7 there is shown the forward portion of a temple piece 12a which is identical to the temple piece 12 shown in FIGS. 1 and 2 except that the temple piece has a positive camber angle. The temple piece 12a is a unitary molded plastic part which is bifurcated at the forward end to provide a first forwardly extending portion 16 having a frusto-conical distal end 17 which is complimentary to a rearwardly facing frusto-conical surface 18 on the lens frame. The manner in which these two frusto-conical surfaces cooperate to provide the detent action which permits the temple piece to be snapped into the fully open position is described in my said earlier patent.

Figure 6:
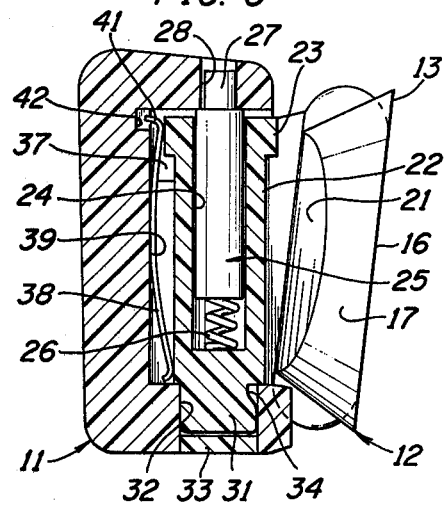
FIG. 6 is a vertical cross-sectional view taken through the assembled hinge from the left side of the eyeglass frame with the temple piece in the closed position.
Figure 7:
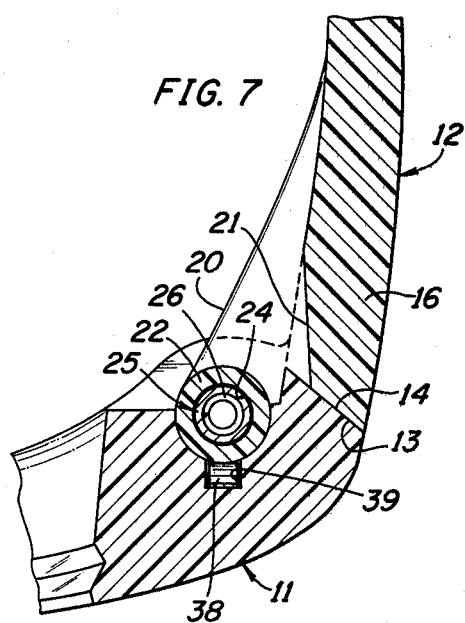
FIG. 7 is a horizontal cross-sectional view of the assembled left-hand temple member and the lens frame in the fully open position.

A second forwardly extending bifurcation 20 is spaced from the first portion 16 by a slot 21 which is substantially triangular in shape when viewed either from the front as shown in FIG. 6 or from the top as viewed in FIG. 7. The bifurcation 20 has a semi-cylindrical end portion 22 which is enlarged at the upper end to provide a portion 23 of increased diameter. A strengthening rib 19 (FIGS. 1 and 3) extends rearwardly from the portion 23 and blends smoothly into the inner face of the temple piece. A blind hole 24 opening at the top receives a pivot pin 25 biased upwardly by a coil spring 26 compressed between the bottom of a recess in the pin 25 and the bottom of the hole 24. The pivot pin 25 has an upper end portion 27 of reduced diameter which is disposed in a hole 28 in the lens frame. Preferably a loose fit is provided beween the portion 27 and the hole 28 to permit full engagement during assembly.

At the lower end of the cylindrical portion 22, a substantially cylindrical portion 31 of reduced diameter is provided and rotatably fits in a cylindrical hole 32 provided in the lens frame in alignment with the hole 28. A plug 33 may be disposed at the bottom of the hole 32 for purposes of esthetics. A groove or undercut 34 is provided near the base of the portion 31 on the outer side thereof to permit assembly of the temple piece to the lens frame as explained in detail hereinafter.

The cylindrical forward portions 22 and 23 of the temple piece are received in a rearwardly facing open hinge socket 35 disposed near the side of the lens frame. The socket has a semi-cylindrical portion 36 against which the temple portion 22 is pivotably disposed, and an arcuate or semiannular groove 37 against which the portion 23 pivotably seats. The groove 37 extends laterally from the socket toward the center of the lens frame to provide clearance for the rib 19 when the temple piece is in the fully closed position against the lens frame. A leaf spring 38 is located in a vertical groove 39 at the bottom of the socket and is compressed between the bottom of the groove 39 and the portions 22 and 23 of the temple piece to press against the surfaces of these portions 22 and 23 and thereby deter spurious movement of the temple piece when it is in other than the fully open position. The spring 38 has an offturned end 41 which seats in a groove 42 to prevent lognitudinal movement of the spring 38 during assembly of the temple piece to the lens frame.

Figure 9:
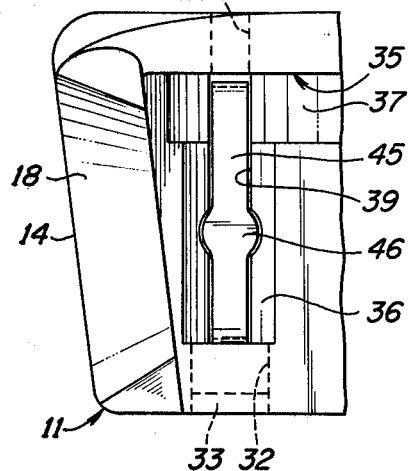
FIG. 9 illustrates an alternative embodiment of the invention.

In FIG. 9 an alternative means for holding the leaf spring in place during assembly is shown. In that embodiment a leaf spring 45 has lateral intermediate projections at 46 which fit in correspondingly shaped notches in the opposite sides of the groove 39. Like the spring 38, the spring 45 has a bend in the middle when in the unstressed condition so that when the temple piece is assembled the end portions of the spring 45 bear against the upper and lower portions 23 and 22 of the temple piece.

In order to assemble the temple piece to the lens frame, the spring 38 is first inserted into the groove and the temple piece is then placed substantially against the rear side of the lens frame. The temple piece is then tilted back and the portion 31 is inserted into the hole 32. With the pin 25 held in a depressed condition with the fingers or with any suitable tool, the temple is then rocked into the socket until the pin snaps into the hole 28. The temple piece may then be swung into the fully open position wherein the frusto-conical portions 17 and 18 are juxtaposed.

In order to permit this snap action to occur, the inner edge of the frame portion 18 is rounded or chamferred at the ends 18a and 18b. The forwardly extending bifurcations 16 and 20, being formed of plastic are sufficiently resilient to provide sufficient flexibility therebetween to enable the surface 17 to ride over the rear edge of the surface 18 and snap into place against the surface 18 when the temple piece is fully open.

Figure 8:
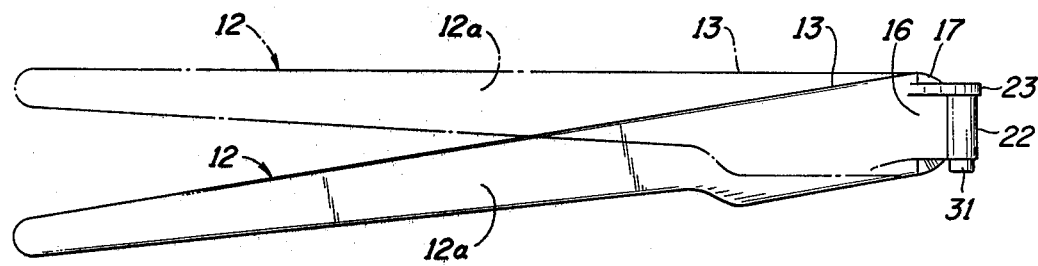
FIG. 8 is an elevational view of a temple piece excluding the pivot six and illustrating a different camber angle which can be provided to assure a proper fit of the eyeglass frame to the user.

In accordance with another feature of the invention, a plurality of left and right hand temple pieces having different camber angles are provided. In FIG. 8 a temple piece having a positive camber angle of ten degrees is shown in solid lines and a temple piece having a zero camber angle is shown in phantom. It is now common practice to provide different sizes of lens frames but the temple pieces all have the same camber. The hinges must, therefore, be either bent or adjusted to fit the temple pieces to the head of the user. Unfortunately, this adjustment is not permanent so that frequent adjustment is required if a good fit is desired. In the system of the present invention, the camber angle is fixed so that a permanent fit is assured.

The present invention may thus be seen to provide a strong and durable eyeglass frame wherein the camber angles of the temple pieces cannot change during use. Moreover, the positions of the fully open temple pieces relative to the lens frame cannot change during use, a common cause of eyeglasses misfitting. In addition, there are no small screws to be lost or to wear out, and the exposed portions of the frame are easily cleaned.

In regard to manufacturing cost, the eyeglass frame assembly of the present invention employs parts which may be injection molded of a suitable plastic such, for example, as a polyester. The only other parts of the frame assembly are the springs 26 and 38 and the pin 25 which may be an inexpensive screw machine part. Assembly and disassembly of the temple pieces is quick and easy and does not require special tools.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. An opthalmic mounting, comprising
    a lens frame having a rearwardly facing shoulder at one side edge thereof,
    a temple member having a forwardly facing outer end surface complimentary to said shoulder and abutting said shoulder when said temple member is in an open position,
    a forwardly extending hinge portion integral with said temple member,
    said hinge portion having a partial cylindrical surface at the distal end thereof,
    said lens frame having a rearwardly opening socket adjacent to said shoulder,
    said socket having a wall portion which is partially cylindircal and complimentary to said cylindrical surface on said temple member,
    a pair of aligned holes in said frame coaxial with the axis of generation of said cylindrical wall portions of said socket,
    a first pivot member extending from one end of said cylindrical surface into one of said holes, and
    an axially movable second pivot means extending into the other of said holes and into an axial hole in said cylindrical surface for removably mounting said temple member to said frame,
    said movable pivot means being spring biases into locking relationship between said temple member and said frame.

2. An opthalmic mounting according to claim 1 wherein said temple member is a unitary molded part,
    the forward end of said temple member is bifurcated,
    said forwardly facing outer end surface of said temple member being disposed on one of said bifurcations, and
    said hinge portion being disposed on the other said bifurcations.

3. An opthalmic mounting according to claim 2 wherein
    said outer end surface on said temple member is a portion of a frusto-conical surface, and
    said hinge portion includes a flexible, resilient section.

4. An opthalmic mounting according to claim 1 comprising spring means interposed between said wall portion of said socket and said cylindrical surface of said temple member for providing friction between said frame and said temple member to prevent spurious relative motion therebetween.

5. An opthalmic mounting according to claim 4 wherein
said spring means is a leaf spring lying in a direction substantially parallel to the axis of generation of the cylindrical wall portion of said socket.

6. An opthalmic mounting according to claim 5 wherein
said first pivot member is an integral part of said temple member and includes an undercut adjacent said cylindrical surface to facilitate assembly of said temple member to said frame.

7. An opthalmic mounting according to claim 1 wherein
said temple member is a molded plastic part, and at least the portion of said frame defining said socket is a molded plastic part.

8. An opthalmic mounting according to claim 7 wherein said temple member comprises
a second partially cylindrical portion adjacent to and of larger diameter than said cylindrical surface portion, and
said socket includes a semi-annular groove in which said second partially cylindrical portion is disposed.

* * * * *